United States Patent [19]

Brauer et al.

[11] 4,408,476

[45] Oct. 11, 1983

[54] ROLLING LINES

[75] Inventors: Hans Brauer, Leichlingen; Werner Demny, Düsseldorf, both of Fed. Rep. of Germany

[73] Assignee: Kocks Technik GmbH & Co., Hilden, Fed. Rep. of Germany

[21] Appl. No.: 285,342

[22] Filed: Jul. 20, 1981

Related U.S. Application Data

[63] Continuation of Ser. No. 18,897, Mar. 9, 1979, abandoned.

[30] Foreign Application Priority Data

Mar. 18, 1978 [DE] Fed. Rep. of Germany ....... 2811931
Dec. 23, 1978 [DE] Fed. Rep. of Germany ....... 2855892

[51] Int. Cl.³ .............................................. B21B 13/00
[52] U.S. Cl. ...................................... 72/229; 72/231; 72/234
[58] Field of Search ................. 72/224, 226, 227, 229, 72/231, 234, 250, 251

[56] References Cited

U.S. PATENT DOCUMENTS

| 349,806 | 9/1886 | McIntosh | 72/236 |
|---|---|---|---|
| 1,782,968 | 11/1930 | Keller | 72/224 |
| 1,928,811 | 10/1933 | Burns | 72/251 |
| 3,132,546 | 5/1964 | Barr et al. | 72/250 |
| 3,178,924 | 4/1965 | McClellan | 72/224 |
| 3,651,676 | 3/1972 | Robertson | 72/12 |
| 3,861,187 | 1/1975 | Leeuwestein | 72/224 |

FOREIGN PATENT DOCUMENTS

109630 1/1940 Australia .............................. 72/224

Primary Examiner—Francis S. Husar
Assistant Examiner—Jonathan L. Scherer
Attorney, Agent, or Firm—Buell, Blenko, Ziesenheim & Beck

[57] ABSTRACT

A rolling line for billets, bars, wire rod or the like, e.g. a roughing line has one or more rolling stands each having three or more driven rolls which are adjustable towards and away from the work material by a worm drive and a screw. The rolls are brought progressively closer together before each pass of the work material, whose cross section is thereby reduced with corresponding elongation. The direction of rotation of the rolls is reversed between each pass, unless two stands for rolling in opposite directions are provided in which case it is possible for the stands to be continuously driven but alternately operative. The work material is turned about its axis through half a roll pitch angle between each pass.

42 Claims, 11 Drawing Figures

| Pass No. | 150 x 150  F₀ = 22500 | Reduction in Cross-section % | Elongation λ |
|---|---|---|---|
| 1 | ⬡ → | 11 | 1,124 |
| 2 | ⬡ ← | 13 | 1,15 |
| 3 | ⬡ → | 15 | 1,176 |
| 4 | ⬡ ← | 20 | 1,25 |
| 5 | ⬡ → | 20 | 1,25 |
| 6 | ⬡ ← | 23 | 1,3 |
| 7 | ⬡ → | 25 | 1,33 |
| 8 | ⬡ ← | 25 | 1,33 |
| 9 | ⬡ → | 15 | 1,176 |
|  | S = 59,66  F₁ = 3082 | 86,3 | 7,3 |

FIG. 8

| Pass No. | 150 x 150 $F_0 = 22\,500$ | Reduction in Cross-section % | Elongation $\lambda$ |
|---|---|---|---|
| 1 | ▱ → ⬡ | 10 ÷ 10 | 1,235 |
| 2 | ⬡ → ⬡ | 12 ÷ 12 | 1,29 |
| 3 | ⬡ → ⬡ | 13 ÷ 13 | 1,32 |
| 4 | ⬡ → ⬡ | 13,6 ÷ 13,6 | 1,34 |
| 5 | ⬡ → ⬡ | 14 ÷ 14 | 1,35 |
| 6 | ⬡ → ⬡ | 15 ÷ 15 | 1,38 |
| 7 | ⬡ → ⬡ | 15 ÷ 15 | 1,38 |
|  | S = 59,66 $F_1 = 3082$ | 86,3 | 7,3 |

| Pass No. | 150 x 150  $F_0 = 22\,500$ | | Reduction in Cross-section % | Elongation $\lambda$ |
|---|---|---|---|---|
| 1 | ⬡ | ← | 11,6 | 1,13 |
| 2 | ⬡ | → | 11,6 | 1,13 |
| 3 | ⬡ | ← | 14 | 1,16 |
| 4 | ⬡ | → | 14 | 1,16 |
| 5 | ⬡ | ← | 20 | 1,25 |
| 6 | ⬡ | → | 20 | 1,25 |
| 7 | ⬡ | ← | 22 | 1,28 |
| 8 | ⬡ | → | 22 | 1,28 |
| 9 | ⬡ | ← | 22 | 1,28 |
| 10 | ⬡ | → | 22 | 1,28 |
| | S = 59,66  $F_1$ = 3082 | | 86,3 | 7,3 |

ROLLING LINES

This is a continuation, of application Ser. No. 18,897, filed Mar. 9, 1979, now abandoned.

This invention relates to improvements in rolling lines for the rolling of billets, bars or wire rod, such as rolling line acting as a roughing or intermediate rolling line, and more particularly to a rolling line having at least one roller stand whose rolling direction is reversible and which has at least three rolls which are adjustable radially of the roll axis.

The known prior art rolling lines of this type which are arranged as roughing lines at a short distance downstream of a furnace and are used to roll starting work material in the form of billets coming from the furnace, have a three-roll stand in which the roll axes extend parallel to one another and substantially horizontally. These rolls are relatively wide and form a plurality of sizing passes of differing sizes, which, in the case of a three-roll stand, are arranged adjacent to one another in two rows located one below the other.

This known prior art rolling line, which is generally only used as a roughing line, has the substantial disadvantage that the work material has to be displaced at least laterally after each pass effected in an alternate rolling direction and, in the case of a three-roll stand, additionally has to be raised or lowered, this having to be effected with relatively great accuracy in order to introduce the work material into the correct sizing pass. For this purpose, structurally complicated guide devices, which are expensive to manufacture, are required upstream and downstream of the rolling stand. In addition to this, the work material repeatedly has to be turned about its longitudinal axis to ensure that the gaps between the rollers are not always located at the same circumferential point of the work material where they would produce a bar-like burr. Therefore, tilting devices have to be provided in addition to the above-mentioned guide devices. The prime costs and the maintenance and repair costs of such guide and tilting devices are high, since these devices are subjected to a considerable amount of wear. The large width of the rolls in the case of the adjacently located sizing passes also results in an uneconomically large width of the roller beds upstream and downstream of the rolling stand. The large width of the rolls is also disadvantageous owing to the fact that it promotes deflection of the rolls. In order to avoid such flexure and thus undesirable widening of the sizing passes, and for reasons of strength in view of the deeply cut sizing pass grooves, one is forced to choose relatively large roll diameters, this being disadvantageous with respect to deformation. The deformation operation is also impaired by virtue of the fact that the individual sizing passes in the known three-roll stand are only formed by two rolls, thus resulting in a considerable increase in the undesired broadening and a reduction in the desired elongation of the work material, and thus impairing the efficiency of deformation. A further substantial disadvantage of the known constructions resides in the fact that a change in the cross sections of the work material and in the passes can only be obtained by changing the rolls with the attendant conversion and long shut-down period of the rolling stand and of the apparatuses arranged in advance of and downstream of the rolling stand.

An object of the invention is to provide a rolling line, such as a roughing line, for the rolling of billets, bars or wire and which does not have the above-mentioned disadvantages and which has improved deformation properties and more favorable deformation efficiency with lower prime and operating costs.

A rolling line in accordance with the invention, has at least one rolling stand whose rolling direction is reversible and which has only one sizing pass formed by at least three rolls which are arranged in a star-like manner around the central longitudinal axis of the work material and are adjustable radially of the roll axis, the rolls being adjustable to a further extent before each successive pass of the work material while the central longitudinal axis of the sizing pass and of the work material remains fixed.

The above-described rolling line in accordance with the invention differs from the known prior art constructions by virtue of the entirely different arrangement of the rolls or of the roll axles and a different number of sizing passes and of rolls which form the sizing pass. It is already known to form a sizing pass from at least three working rolls, and to arrange the rolls in a star-like manner around the central longitudinal axis of the work material rolling axis. However, these features have hitherto not been used in the case of reversing roll stands. It was considered that roll stands, in which the single sizing pass is formed by three or more rolls are not suitable for reversing operation, since it was considered, that, in practice, the radial adjusting movement of the rolls required for this purpose could not be performed in rolling stands of this type. In contrast to this, it has now been realized by the inventors that rolling stands of this type can also be used for reversing operation in a particularly advantageous manner.

As a result of the construction in accordance with the invention, there is no need to displace the work material laterally or to raise and lower it, since the central longitudinal axis of the sizing pass and of the work material is fixed. Thus, all the equipment upstream and downstream of the rolling stand or stands, which are required for this purpose in the known prior art constructions, can be omitted. Thus, there is a considerable saving on prime costs and the maintenance and repair costs are also reduced to a considerable extent. Furthermore, the fixed position of the longitudinal central axis of the sizing pass and of the work material results in only a narrow roller bed, and the width of the rolls is so small that there is no risk of deflection. The larger number of rolls per sizing pass leads to reduced broadening, greater elongation, and thus to significantly better deformation efficiency than is obtainable in the known prior art constructions. Improved efficiency of deformation also requires smaller drive powers and results in a lower consumption of energy. Furthermore, lower rolling pressures are obtained by using three or more rolls per sizing pass, thus resulting in equalization of the differing broadening behavior of the work material.

A further substantial advantage resides in the fact that optional first pass entry cross sectional areas are rollable within wide limits, and polygonal cross sections, particularly hexagonal cross sections in the case of a three-roll stand, of optional dimensions can be produced. A change in the cross sectional size and in the passes does not require the rolls to be changed or any other conversions, but only requires a change in the adjustment of the rolls. This also eliminates the shutdown times thus caused in the known prior art constructions, thus resulting in a significant improvement in the annual output of the rolling line in accordance with the invention. The use of three rolls per sizing pass is preferred, so that, in addition to the advantages resulting from the reversing operation with fixed central longitudinal axes of the sizing pass and of the work material, there are the known advantages of sizing passes formed by three rolls. The latter reside in the fact that, as a result of a substantially more uniform distribution of the stresses occurring in the work material, the work material is stressed to a lesser extent than in the case of a sizing pass formed by only two rolls. Tests have shown that surface cracks in the starting material are reduced to a greater extent in the case of three-roll sizing passes than in the case of two-roll sizing passes. This advantage renders it possible to reduce the cost of reconditioning and cleaning the starting material. Furthermore, the simultaneous deformation of the work material from three or more sides, and the all-round compressive stresses thus achieved also result in uniform compresses of the material in the core of the work material, this being essential particularly during the rolling of cast products. Thus, in order to obtain a satisfactory rolling structure, the amount of elongation required is also not as great as that in the case of two-roll sizing passes, this being of importance particularly in the production of relatively large finished cross sections.

It is advisable for each roll to have a cylindrical working surface and, contiguous to each side thereof, a lateral surface which slopes relative to the working surface, and for the regions of transition between the working surface and the lateral surfaces to be rounded to a large radius. When the working surfaces are only partially used for deformation, the cross section of the incoming work material can vary within wide limits without thereby impairing the deformation properties and the geometry of the sizing pass. Furthermore, the rounding of the region of transition has the advantage that, when the cross section of the incoming work material is particularly large and the sizing pass is over-filled, so that the work material extends beyond the working surfaces into the region of the lateral surfaces, over-rolling still does not occur. Thus, the rounding of the regions of transition renders it possible to roll larger first pass entry cross sectional areas. It is then immaterial whether the configurations of the first pass entry cross sectional area are round, octagonal, hexagonal or square. The ratio of the maximum possible entry area to the minimum possible delivery area is approximately 7:1. The possible elongation of approximately $\lambda=7$ resulting from this ratio is obtained by splitting up the entire deformation operation into a number of passes. The run-through direction of the work material to be deformed is repeatedly changed, and the diameter of the rotional, inscribed circle of the pass is varied by corresponding adjustment of the rolls before each pass.

The rolling line in accordance with the invention, can be equipped with just one rolling stand and, in accordance with one embodiment of the invention, a tilting device for turning the work material about its longitudinal axis is provided upstream and downstream of the rolling stand. In order to avoid the formation of burrs, the work material is turned about its longitudinal axis by means of the tilting device after each pass. Even though it is necessary to use tilting devices in this preferred embodiment of the invention, there is no need for other devices which, are required in the known prior art constructions for laterally displacing and for raising or lowering the work material.

In a more advantageous embodiment of the rolling line, in accordance with the invention, two or more rolling stands are arranged one behind the other, the rolls of two adjacent rolling stands being angularly offset relative to one another by half a pitch angle between the rolls of a given stand. The tilting devices can then also be entirely omitted. Furthermore, the angularly offset arrangement of the rolls has the advantage that the distance between the rolling stands can be kept very small and, indeed, can be kept so small that guides for the work material between the stand can sometimes also be omitted. On the other hand, however, it is advisable to provide adjustable guides for the work material at the entry end and delivery end at the smallest possible distance from the rolls. This applies particularly when the rolling line has only a single rolling stand. The guides should be adjustable together with the rolls, preferably by means of a common adjusting device.

In a further development of the invention, the adjusting movements of the rolls and the rotational speeds, the directions of rotation of the rolls, and the number of passes to be performed can be automatically performable or adjustable by means of a pre-programmed computer. Thus, the rolling operation can be performed substantially automatically.

Furthermore, it is advantageous to provide thermally insulating and/or heatable jackets for the rolling line at the entry and/or delivery end of the rolling stand or stands. Thus, the heat loss of the work material during the rolling operation is avoided or offset. It is possible, without difficulties, to perform a large number of passes without a significant fall in temperature.

In an advantageous embodiment of the invention having a three-roller stand, the cross section of the work material is a hexagonal cross section after the last pass. A cross sectional configuration such as this can be further processed in a particularly satisfactory manner in the devices arranged downstream. Furthermore, a hexagonal cross sectional configuration can be readily obtained, particularly with the advantageous three-roll sizing passes whose cylindrical working surfaces are simple to produce and recondition. Thus, it is also possible to arrange on each rolling stand a device for machining the sizing passes of the rolls. Owing to the straight generatrix of the working surface of the rolls, the machining device can be of simple construction and can be arranged in a minimum amount of space. Cutting tools as well as grinding devices can be provided as the machining tools. A sizing pass machining device on each stand avoids the provision of a separate sizing pass processing machine and also avoids the removal of the rolling stand for the purpose of reconditioning the rolls.

In general, in the case of two or more rolling stands it is advisable for each rolling stand to have a separate drive. This has the advantage that the rolling operation can be performed substantially free from tension, that is to say, no appreciable tensile forces occur in the work material between the rolling stands so that thickened ends are avoided. If the entry cross section is constant, the rotational speeds can be chosen such that the tension is zero. Owing to the fact that the rolls are always readjusted before each pass of the work material, the elongation and thus the run-through speed of the work material varies, so that the prevailing peripheral velocity of the rolls can be adapted by an appropriate change in the rotational speed of the rolls. This is rendered possible in a particularly satisfactory manner with an individual drive for each stand.

When the starting material is slightly tapered before commencement of the rolling operation, which is the case when processing cast starting material, the elongation of the work material varies continuously, and the rotational speed set for a specific tension-free reduction of surface area in the second rolling sizing pass then only applies accurately to a specific cross section entering this sizing pass. However, since this surface area changes continuously in the case of tapered ingots, this represents an undesirable interference with the tension-free state. It is then advisable to adjust the first sizing pass to the larger of the two possible first pass entry cross sectional areas of the tapered starting work material and to allow the end of the work material having the larger cross section to enter first. If a slight tension should be established, which may be advantageous for the sake of stability, the thickened end which is forming would not involve any substantial absolute thickening owing to the cross section which is then in any case decreasing. The possibility of the formation of a perceptibly thickened end during the first pass is more likely when the smaller cross section of the ingot enters first. The slight thickening, which may result when rolling with slight tension, would then have to be added to the thicker following cross section.

The rolling line in accordance with the invention is also suitable for producing various polygonal cross sections, particularly triangular and hexagonal configurations, so that, in the case of such products, a rolling line in accordance with the invention can also be used as a finishing line. Since the choice of the elongation and the number of passes is largely optional, virtually any first pass entry cross sectional area can, within wide limits, be rolled to any finished cross section without involving conversion work involving shutdown periods. It is only necessary correspondingly to set the computer and the pre-selection devices at the control desk according to the rolling program.

In an advantageous embodiment of the invention having two rolling stands, both the rolling stands are driven by a common motor at the same rotational speeds, although in opposite, constant directions of rotation. Only one rolling stand thereby rolls the work material during each pass, while the rolls of the other rolling stand are moved apart to an extent where they can no longer perform a rolling operation. Reversing operation is effected by changing the rolling stand which is effective and thus the direction in which the effective rolls rotate. It is thus unnecessary to reverse the drive and consequently to decelerate and accelerate all the rotating parts. Alternatively, the drive motor can be in the form of a three-phase motor, since sensitive regulation of the rotational speed is not required owing to the fact that, with only one rolling stand, a fluctuation in the rotational speed cannot have any disadvantageous results.

For the purpose of producing rolled material of sound section, each of the rolls can be provided with a central continuous, groove of circular-segment-like cross section, and when the rolls are adjusted with their axes at the shortest possible distance from the central longitudinal axis, the said grooves form three outer areas of a substantially circular sizing pass disposed concentrically of the central longitudinal axis, which sizing pass has the desired diameter of the work material as a finished dimension, although it is open in the region of the gaps between the rolls the work material being turned about its longitudinal axis only through a quarter of the pitch angle of the rolls before the next to last pass, but being otherwise turned about its longitudinal axis through half a pitch angle.

However, this circular cross sectional configuration is only formed during the two last passes of the work material. In the preceding passes, the grooves in the working surfaces of the rolls produce, on the otherwise flat outer surfaces of the work material, bulges having a circular-segment-like cross section whose radii already correspond to half the diameter of the finished work material. According to the required number of passes with corresponding reduction of the cross section of the work material the centers of the arcs of the bulges are moved towards one another in a radial direction until they all lie on the central longitudinal axis of the sizing pass and of the work material. The axes of the rolls are then at the smallest possible distance from the central longitudinal axis, and the work material has a cross sectional configuration which is already substantially circular and has only small corner regions. In order to eliminate these corner regions also, the work material is only rotated through a quarter of the pitch angle before the last pass but one is effected. When the work material is then introduced into the sizing pass in this manner, every other corner region is rolled by a sizing pass bottom and is thereby removed. Before the last pass, the work material is again turned through half a pitch angle about its longitudinal axis at the outset, wherein the remaining corner regions are also eliminated and a circular cross section is produced. The pitch angle refers to that angle which is obtained when the full circle of 360 degrees is divided by the number of rolls.

It is advisible for the angle of the axis of the circular-segment-like grooves to be at least 30 degrees, preferably in excess thereof. The regions which are rolled by the grooves then overlap one another, and the corner regions are fully eliminated.

In a rolling line having only one rolling stand, and in a further development of the invention, it is advantageous to arrange a guide and tilting device only downstream of the roller stand when viewed in the direction of the first pass. This embodiment is particularly suitable for simple rolling lines which are only designed for a relatively small output. A second guide and tilting device is not required upstream of the rolling stand in a rolling line of this type, thus resulting in a considerable saving on prime costs. This saving is rendered possible by the fact that accurate guidance of the work material is not important during the first pass, since the work material automatically runs into the most stable position. In the case of a sizing pass which is formed by, for example, three rolls, work material having a substantially triangular cross section is produced which, however, has to be rolled to a substantially hexagonal cross section in the second pass in the opposite rolling direction, which means that the rolling operation is effected across the corners of the triangular cross section. This operation necessitates, for the first time, the guide and tilting device arranged beyond the rolling stand. The substantially hexagonal cross section existing after the second pass is again rolled to a substantially triangular cross section during the third pass, the hexagonal starting cross section itself preventing the work material from tilting, so that a guide and tilting device is again not required. Thus, the work material is turned only after the first, third, fifth, etc., pass, that is, after each odd numbered pass.

The invention is further described by way of example, with reference to the drawings, in which.

Figure 1:
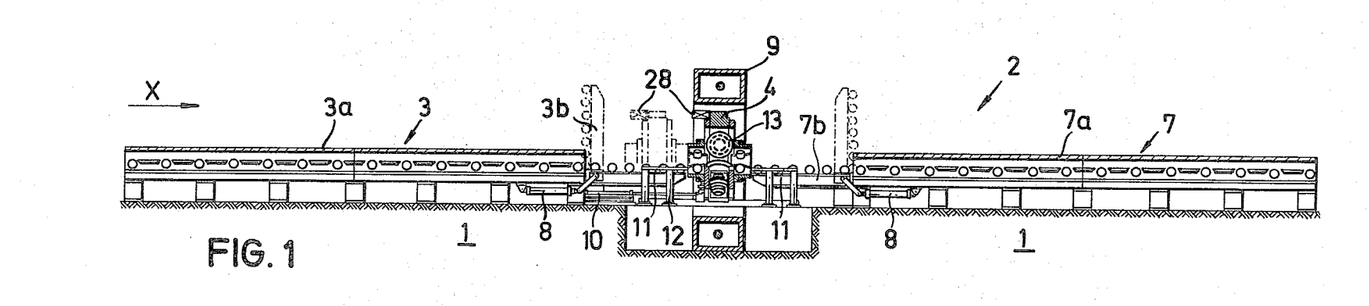
FIG. 1 is a side elevation of a rolling line having only one rolling stand.

Referring to FIG. 1, a hot rolling line 2 having a foundation is fed with hot work material, such as billets, from a furnace (not illustrated) in the direction of the arrow. The billets move along a roller bed 3 to a rolling stand 4 which is driven by a motor 6 by way of a reduction gear 5 shown in FIG. 2. The work material (not illustrated) passes through the stand 4 from the roller bed 3 on the entry side to roller bed 7 on the delivery side. The two roller beds 3 and 7 are provided with a thermally insulating and if required, also heatable jacket 3A, 7A respectively, the jackets only being omitted in the immediate vicinity of the rolling stand 4. Instead of being provided with jackets in this region, the roller beds 3 and 7 are constructed such that their portions 3B and 7B can be swung upwardly by means of working cylinders 8, as is shown by dash-dot lines in FIG. 1.

After the swinging-up of, for example, the roller bed portion 3b, the rolling stand 4 can be displaced on slides 11 held by supports 12 by means of working cylinders 10 in an axial direction towards the left as viewed in FIG. 1 until it is clear of its C-shaped frame 9 and can be removed from the rolling line by means of, for example, a crane or some other apparatus (not illustrated) for changing the rolling stand.

Figure 2:
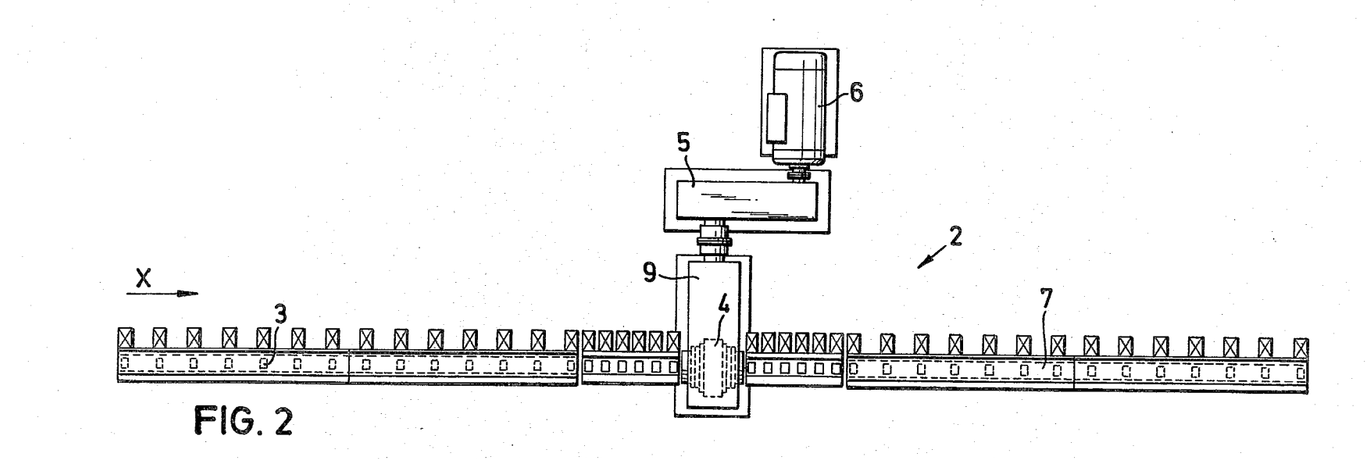
FIG. 2 is a plan view of the rolling line of FIG. 1.
Figure 3:
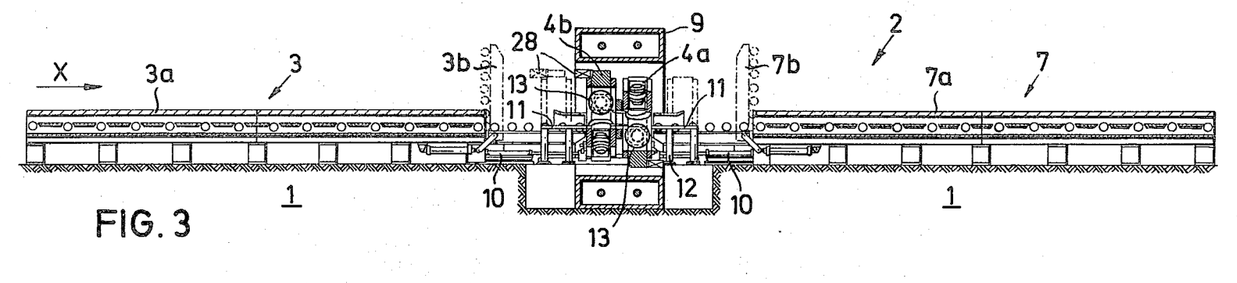
FIG. 3 is a side elevation of a rolling line having two rolling stands.
Figure 4:
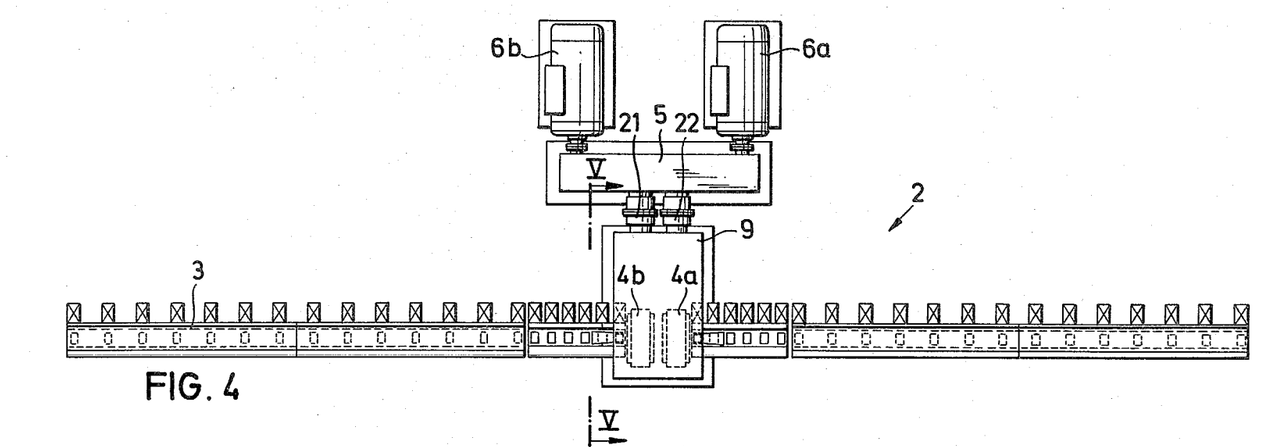
FIG. 4 is a plan view of the rolling line of FIG. 3.

The embodiment of FIGS. 3 and 4 substantially corresponds to the embodiment of FIGS. 1 and 2, so that the same reference numerals have been used for the same parts. The essential difference between the two embodiments resides in the fact that, in the embodiment of FIGS. 3 and 4, two rolling stands 4a and 4b are provided which are also driven by two drive motors 6a and 6b. The rolling stands 4a and 4b can be removed from the common C-shaped frame 9 towards both sides. As in the embodiment of FIG. 1, working cylinders 10 are used for this purpose. The stands 4a and 4b slide on slide guides 11 held by supports 12.

Figure 5:
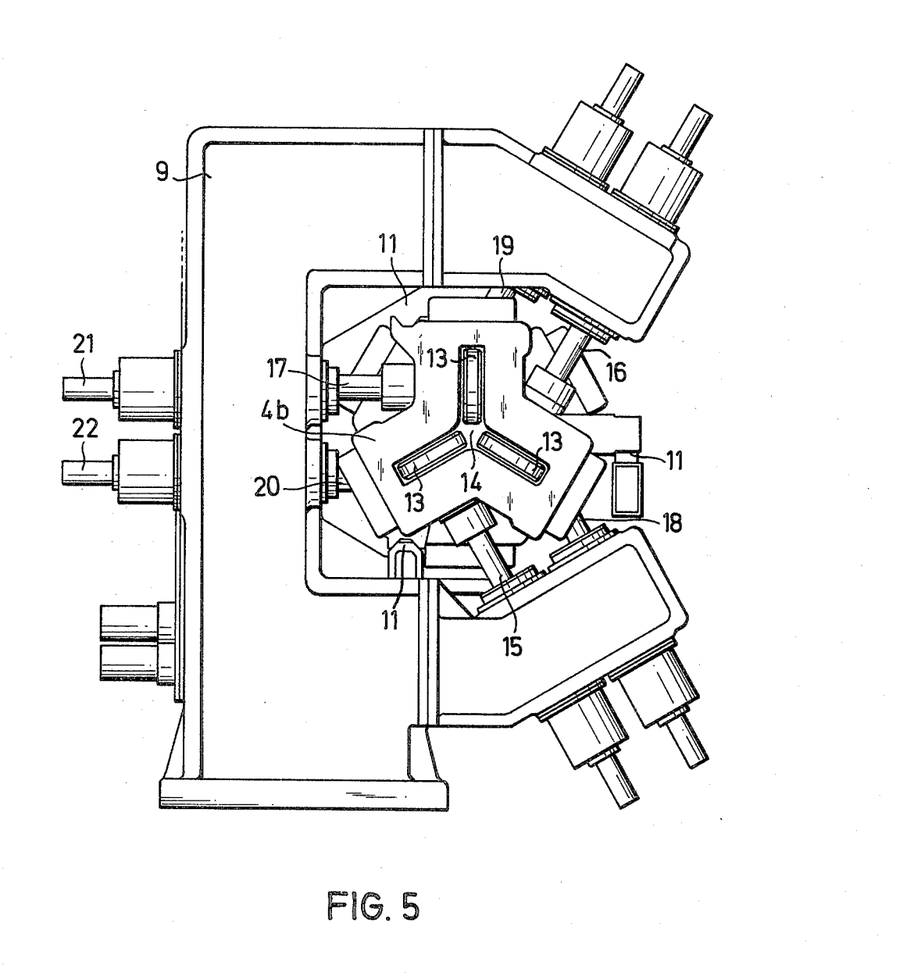
FIG. 5 is a section taken on the line V—V of FIG. 4.

The arrangement of the slides 11 and of the rolls 13 relative to the central longitudinal axis 14 of the working material is shown particularly clearly in FIG. 5. Drive shafts 15, 16 and 17 drive the rolling stand 4b arranged at the entry end, while the other drive shafts 18, 19 and 20 (only partially visible) drive the roller stand 4a which is arranged at the delivery end and which is angularly offset about the central longitudinal axis 14 by the amount of half a pitch angle. The C-shaped frame 9 contains the transmission elements for the rotary movements, and the drive power is transmitted from the drive journals 21 and 22 to the drive shafts 15 to 20.

Figure 6:
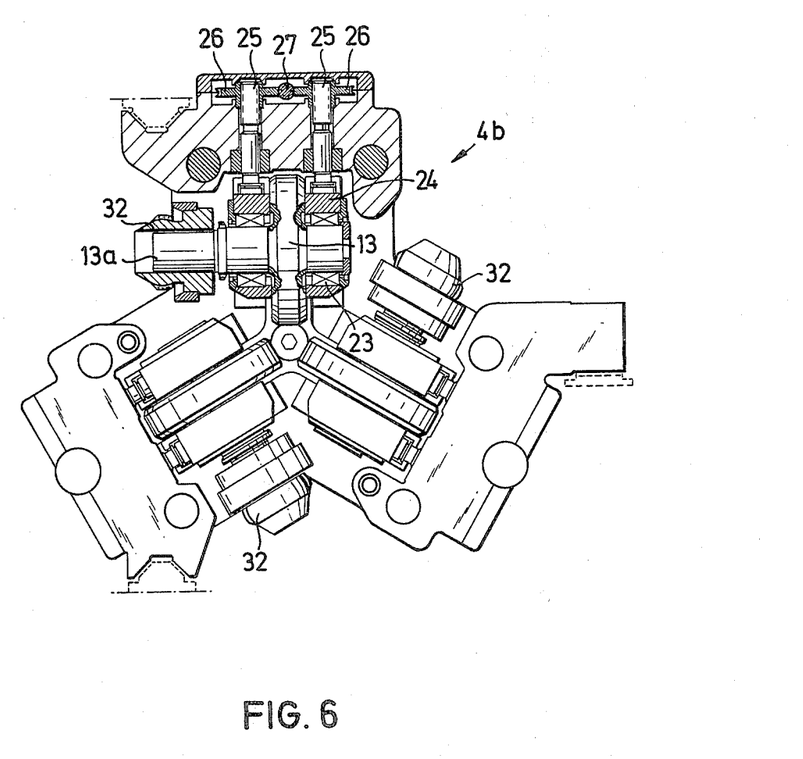
FIG. 6 shows a rolling stand of FIGS. 1 to 5, partially sectioned.

The rolling stand 4b is shown separately in FIG. 6. The section in the figure shows how the upper roll 13 is adjustably journalled; this also applies to the other rolls. The roll axle 13a is journalled in roller bearings 23 which are in turn located in chocks 24. The chocks 24 are adjusted synchronously by means of screw-threaded spindles 25, this being effected by respective worm wheels 26 and a common worm gear shaft 27. A worm gear shaft 27 is driven by an adjusting motor 28 which is shown in FIGS. 1 and 3. In order to enable the rolls 13 to be changed, they can be moved in the rolling direction by means of the chocks 24 after a plate (not illustrated in FIG. 6) has been removed.

In order to compensate for the axial offset between the drive shafts 15 to 20 on the one hand and the roll axle 13a and the other roll axles on the other hand, the latter have universal coupling parts 32 by virtue of which the adjusting movement of the rolls 13 is possible.

Figure 7:
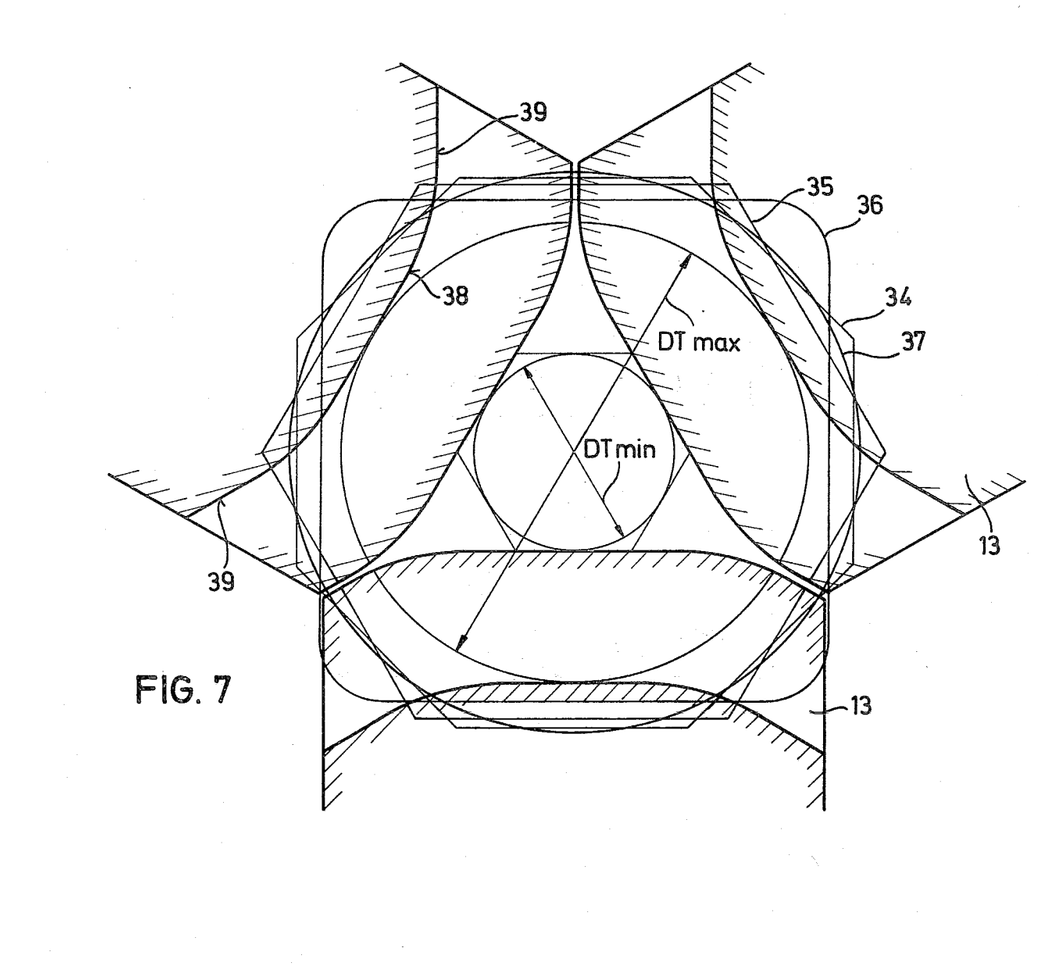
FIG. 7 shows a sizing pass with the two extreme positions of the rolls.

The sizing pass is drawn to a larger scale in FIG. 7, namely such that the rolls 13 form the smallest sizing pass, so that only the smallest rotional inscribed circle of the diameter $DT_{min}$ has space therein. The same figure also shows the largest sizing pass in which the rolls 13 have been moved apart to the greatest possible extent and in which the largest rotional inscribed circle of the diameter $DT_{max}$ can be accommodated. Also illustrated are the largest possible octagon 34, the largest possible hexagon 35, the largest possible square 36 and the largest possible circular cross section 37, all of which can be used as first pass entry cross sectional areas. It will be clearly seen that these largest possible cross sections extend beyond the working surfaces 38 of the rolls 13 towards the lateral surfaces 39 of the rolls 13. The regions of transition between the two surfaces 38 and 39 are rounded to a large radius, so that there is no risk of over-rolling.

Figure 8:
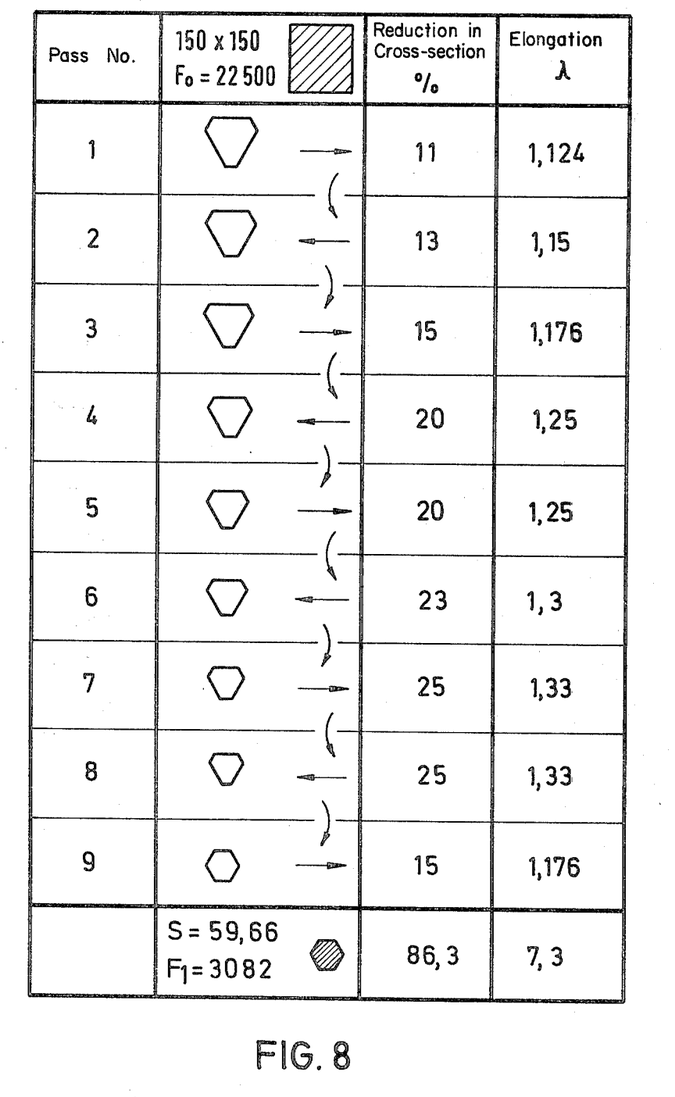
FIG. 8 is a chart showing the sizing passes of the embodiment of FIGS. 1 and 2.
Figure 9:
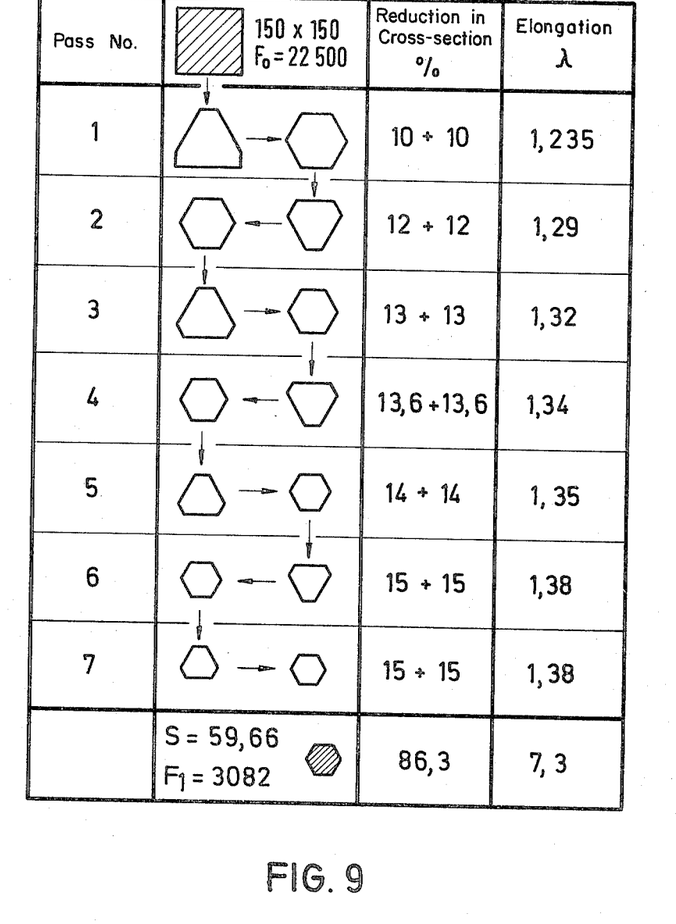
FIG. 9 is a chart of the sizing passes of the embodiment of FIGS. 3 and 4.

FIGS. 8 and 9 show the individual cross sectional configurations, cross sectional reductions and elongations during the various passes with the same starting cross section. The horizontal arrows denote the particular rolling direction, while the vertical arrows symbolize the roller adjustment. The vertical arrows in FIG. 8 are curved to indicate that, in the embodiment of FIGS. 1 and 2 (to which FIG. 8 relates), the work material is turned about its longitudinal axis by half the pitch angle, i.e. through 60°, this being unnecessary in the embodiment of FIGS. 3 and 4 (to which FIG. 9 relates). FIGS. 8 and 9 show a square section, starting material of 150 mm × 150 mm cross section, area 22500 mm² and a hexagonal section rolled material, 59.66 mm across the flats and area 3082 mm².

Figure 10:
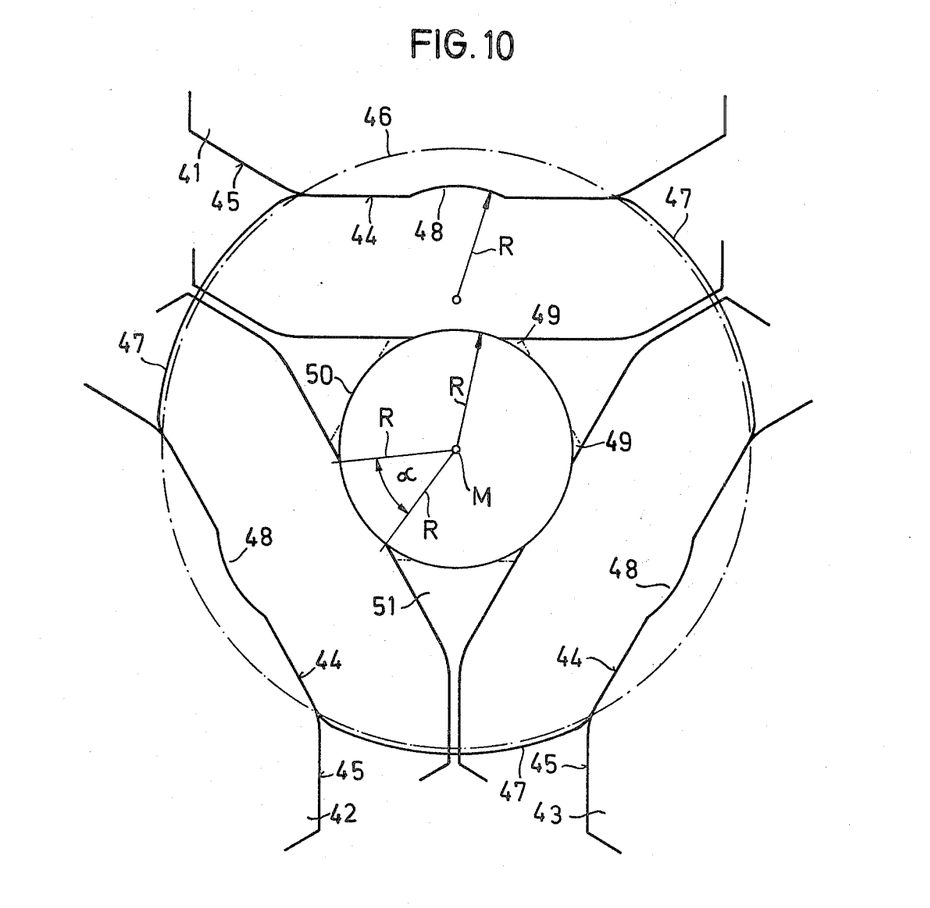
FIG. 10 shows a modified sizing pass with the rolls in both extreme positions.

Referring to FIG. 10 which shows a modified rolling stand for a rolling line according to the invention, rolls together forming a sizing pass 11 are designated 41, 42 and 43. However, owing to the large scale, only a small portion of the rolls 41, 42, 43 is visible. The rolls have a cylindrical working surface 44 and lateral surfaces 45, the region of transition between the two surfaces being rounded to a large radius. The first pass entry cross sectional area, that is to say, the cross sectional configuration of the starting material, is shown by a dash-dot circle 46 which can have a diameter of, for example, 180 millimeters. The roll surface designated 44 and 45 show the rolls 41, 42 and 43 in their outermost setting, that is to say, the axes of the rolls are at the greatest possible distance from the central longitudinal axis designated M. Thus, the circle 46 denotes the maximum first pass entry cross sectional area rollable by means of the sizing pass.

After the first pass of the work material, the work material acquires a cross sectional configuration denoted by the contours of the working surface 44 of the rolls 41, 42, 43 and having bulges 47 in the region of the gaps between the rolls. A continuous angular peripheral groove 48 is found in the exact center of the cylindrical working surfaces 44 of the rollws 41, 42, 43, so that, after the first pass, the work material has corresponding strip-like bulges in the region of its flat sides.

Before the second pass and before further passes, the work material is turned about the central longitudinal axis M through half a pitch angle (through 60° in the present embodiment having a three-roll sizing pass), and the rolls 41, 42 and 43 are adjusted by a specific amount radially of the central longitudinal axis M. This continues until the smallest possible sizing pass, also illustrated in FIG. 1, is attained. The work material then has a cross section 60 which is almost circular and which has a radius R with the center lying on the central longitudinal axis M. The grooves 8 thus in the working surfaces 44 of the rolls 41, 42, 43 thus have the radius R of the desired finished cross section 50.

However, the work material still does not have a truly circular cross section, since the corner regions 9, shown by dash-dot line, still exist. In order to eliminate these corner regions, the work material is rolled again with the same roll adjustment, that is to say, with the smallest sizing pass, although it is introduced in a position in which it is turned through a quarter of the pitch angle, that is to say, 30 degrees. Each second corner region 9 is then rolled to a circular configuration, since it then enters the regions of the grooves 8. Before the last pass, the work material is again turned through half a pitch angle, 60 degrees in the present instance, so that the remaining corner regions 9 are also rolled to a circular configuration. A circular finished cross section 50 has then been obtained and, in the above-mentioned example with a first pass entry diameter of 180 millimeters, can, if required, have a diameter of 70 millimeters. As a result of this finished cross section 50, the grooves 48 in the present example have been incorporated with radii R of 35 millimeters and obtained an angle of at least 30 degrees, preferably in excess thereof.

Figure 11:
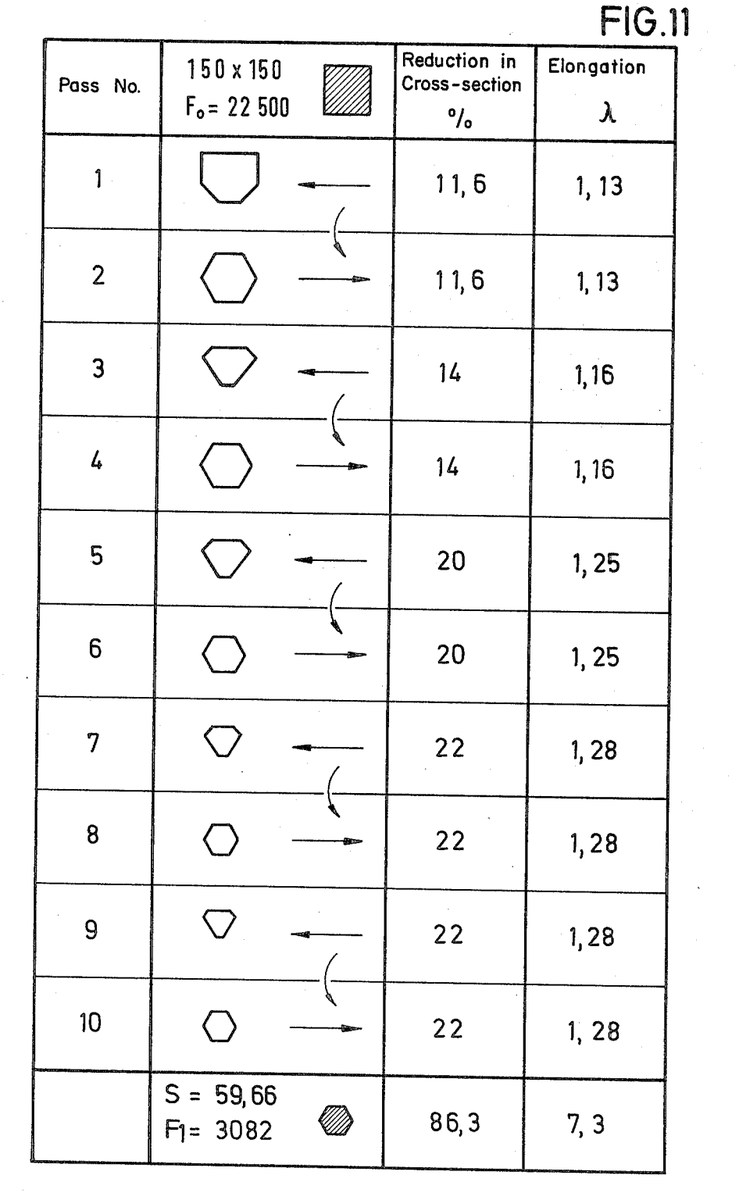
FIG. 11 is a chart of the sizing passes for a rolling line having only one guide and tilting device.

FIG. 11 shows, by way of example, the individual cross sectional configuration, cross sectional reductions and elongations during the various passes of a specific starting cross section. The values apply to a square having an edge length of 150 millimeters as the starting cross section, and to a rolling line having only one rolling stand as shown in FIG. 10, whose rolls have a diameter of 600 millimeters and in which a guide and tilting device is arranged only beyond the rolling stand when viewed in the direction in which the first pass is effected. The horizontal arrows show the particular rolling direction, while the vertical arrows symbolize the turning of the work material. For the sake of simplicity, the bulges produced by the grooves 8, and the final rolling of the work material to form a circular configuration have been omitted from FIG. 11, since the bulges could only be shown with very small dimensions in the drawing.

In the foregoing specification we have set out certain preferred embodiments and practices of our invention; however, it will be understood that this invention may be otherwise embodied within the scope of the following claims.

We claim:

1. A rolling line for the rolling of billets, bars or wire to provide a substantial reduction in cross section by repeated incremental reductions, comprising at least one rolling stand whose rolling direction is reversible and which has only one sizing pass formed by at least three rolls which are arranged in a star-like manner around the central longitudinal axis of a pass line for work material to be rolled through which said billets, bars and wires are repeatedly passed back and forth for reduction in cross section, said rolls having a substantially larger diameter than axial width and a substantially cylindrical working surface and being adjustable radially of the roll axis a distance at least equal to the total radial reduction in cross section of said billets, bars or wire, means for simultaneously adjusting said rolls radially uniformly before each successive pass of the work material while maintaining the central longitudinal axis of the sizing pass and of the work material fixed.

2. A rolling line as claimed in claim 1 in which each of the rolls has a cylindrical working surface and lateral surfaces adjacent to each side of the working surface and sloping relative to the working surface, the regions of transition between the working surface and the lateral surfaces being rounded to a large radius.

3. A rolling line as claimed in claim 1 or 2 in which adjustable guides for the work material are provided at the entry and delivery ends at the smallest possible distance from the rolls.

4. A rolling line as claimed in claim 3 in which the guides are adjustable together with the rolls.

5. A rolling line as claimed in claim 4 in which the rolls and the guides have a common adjusting device.

6. A rolling line as claimed in claim 1 or 2 in which a pre-programmed computer is provided for adjusting the rolls, and the rotational speeds, for changing the directions of rotation of the rolls, and for determining the number of passes.

7. A rolling line as claimed in claim 3 in which a pre-programmed computer is provided for adjusting the rolls, and the rotational speeds, for changing the direction of rotation of the rolls, and for determining the number of passes.

8. A rolling line as claimed in claim 4 in which a pre-programmed computer is provided for adjusting the rolls, and the rotational speeds, for changing the directions of rotation of the rolls, and for determining the number of passes.

9. A rolling line as claimed in claim 1 or 2 in which terminally insulating and/or heatable jackets are provided for the rolling line at the entry and/or delivery ends of the rolling stand or stands.

10. A rolling line as claimed in claim 3 in which thermally insulating and/or heatable jackets are provided for the rolling line at the entry and/or delivery ends of the rolling stand or stands.

11. A rolling line as claimed in claim 4 in which thermally insulating and/or heatable jackets are provided for the rolling line at the entry and/or delivery ends of the rolling stand or stands.

12. A rolling line as claimed in claim 1 or 2 in which the cross section of the work material after the last pass is hexagonal.

13. A rolling line as claimed in any of claims 1 or 2 in which apparatus for machining the sizing passes of the rolls is arranged on the or each rolling stand.

14. A rolling line as claimed in claim 3 in which apparatus for machining the sizing passes of the rolls is arranged on the or each rolling stand.

15. A rolling line as claimed in claim 4 in which apparatus for machining the sizing passes of the rolls is arranged on the or each rolling stand.

16. A rolling line as claimed in claim 6 in which apparatus for machining the sizing passes of the rolls is arranged on the or each rolling stand.

17. A rolling line as claimed in any of claims 1 or 2 having two or more rolling stands in tandem each rolling stand having a separate drive.

18. A rolling line as claimed in claim 3 having two or more rolling stands in tandem each rolling stand having a separate drive.

19. A rolling line as claimed in claim 4 having two or more rolling stands in tandem each rolling stand having a separate drive.

20. A rolling line as claimed in claim 6 having two or more rolling stands in tandem each rolling stand having a separate drive.

21. A rolling line as claimed in claim 9 having two or more rolling stands in tandem each rolling stand having a separate drive.

22. A rolling line as claimed in claim 1 or 2 having two or more rolling stands in tandem, in which no appreciable tensible force exists in the work material between the rolling stands during the rolling operation.

23. A rolling line as claimed in claim 3 having two or more rolling stands in tandem, in which no appreciable tensible force exists in the work material between the rolling stands during the rolling operation.

24. A rolling line as claimed in claim 4 having two or more rolling stands in tandem, in which no appreciable tensible force exists in the work material between the rolling stands during the rolling operation.

25. A rolling line as claimed in claim 6 having two or more rolling stands in tandem, in which no appreciable tensible force exists in the work material between the rolling stands during the rolling operation.

26. A rolling line as claimed in claim 9 having two or more rolling stands in tandem, in which no appreciable tensible force exists in the work material between the rolling stands during the rolling operation.

27. A rolling line as claimed in claim 22 for a tapered starting work material in which the first sizing pass is adjusted to the larger of the two possible first pass entry cross sectional areas.

28. A rolling line as claimed in claim 1 or 2 having two rolling stands in tandem, in which the two rolling stands are driven by a common motor at the same rotational speeds but in opposite, constant directions of rotation.

29. A rolling line as claimed in claim 3 having two rolling stands in tandem, in which the two rolling stands are driven by a common motor at the same rotational speeds but in opposite, constant directions of rotation.

30. A rolling line as claimed in claim 4 having two rolling stands in tandem, in which the two rolling stands are driven by a common motor at the same rotational speeds but in opposite, constant directions of rotation.

31. A rolling line as claimed in claim 6 having two rolling stands in tandem, in which the two rolling stands are driven by a common motor at the same rotational speeds but in opposite, constant directions of rotation.

32. A rolling line as claimed in claim 9 having two rolling stands in tandem, in which the two rolling stands are driven by a common motor at the same rotational speeds but in opposite, constant directions of rotation.

33. A rolling line as claimed in claim 1 or 2 which has only one roller stand, and tilting devices, one arranged upstream and one downstream of the rolling stand for the purpose of turning the work material about its longitudinal axis.

34. A rolling line as claimed in claim 3 which has only one roller stand, and tilting devices, one arranged upstream and one downstream of the rolling stand for the purpose of turning the work material about its longitudinal axis.

35. A rolling line as claimed in claim 4 which has only one roller stand, and tilting devices, one arranged upstream and one downstream of the rolling stand for the purpose of turning the work material about its longitudinal axis.

36. A rolling line as claimed in claim 1 or 2 having two or more rolling stands arranged in tandem the rolls of two adjacent rolling stands being angularly offset relative to one another by half a pitch angle.

37. A rolling line as claimed in claim 3 having two or more rolling stands arranged in tandem the rolls of two adjacent rolling stands beings angularly offset relative to one another by half a pitch angle.

38. A rolling line as claimed in claim 4 having two or more rolling stands arranged in tandem the rolls of two adjacent rolling stands being angularly offset relative to one another by half a pitch angle.

39. A rolling line as claimed in claim 1 or 2 having only one roller stand, in which a guide and tilting device is arranged only downstream of the rolling stand when viewed in the direction in which the first pass is effected.

40. A rolling line as claimed in claim 1 or 2 in which each of the rolls has a central peripheral groove in its cylindrical working surface, such groove being of circular-segment-like cross section, whereby the grooves form outer portions of a substantially circular sizing pass disposed concentrically of the central longitudinal axis and having the desired diameter of the work material as a finished dimension, when the rollers are adjusted with their axes at the shortest possible distance from the central longitudinal axis, the work material being turned about its longitudinal axis only through a quarter of the pitch angle of the rolls just before being subjected to the next to last pass, but is otherwise turned about its longitudinal axis through half a pitch angle.

41. A rolling line as claimed in claim 1 or 2 in which the subtended angles of the circular-segment-shaped grooves are at least one quarter of the pitch angle.

42. A rolling line as claimed in claim 1 or 2 in which the or each rolling stand has three rolls at 120° to one another.

* * * * *

UNITED STATES PATENT AND TRADEMARK OFFICE
CERTIFICATE OF CORRECTION

PATENT NO. : 4,408,476

DATED : October 11, 1983

INVENTOR(S) : Hans Brauer and Werner Demny

It is certified that error appears in the above-identified patent and that said Letters Patent is hereby corrected as shown below:

Column 3, line 54, "rotional," should be deleted.

Column 7, line 23, after "foundation", --1-- should be inserted.

Column 8, line 24, "rotional" should be deleted.

Column 8, line 28, "rotional" should be deleted.

Column 9, line 11, "rollws" should be --rolls--.

Column 9, line 22, "cross section 60" should be --cross section 50--.

Column 9, line 24, "grooves 8" should be --grooves 48--.

Column 9, line 28, "regions 9" should be --regions 49--.

Column 9, line 35, "region 9" should be --region 49--.

Column 9, line 36, "grooves 8" should be --grooves 48--.

UNITED STATES PATENT AND TRADEMARK OFFICE
CERTIFICATE OF CORRECTION

PATENT NO. : 4,408,476           Page 2 of 2
DATED      : October 11, 1983
INVENTOR(S): Hans Brauer and Werner Demny It is certified that error appears in the above-identified patent and that said Letters Patent is hereby corrected as shown below:

Column 9, line 39, "regions 9" should be --regions 49--.
Column 9, line 61, "grooves 8" should be --grooves 48--.
Claim 37, column 12, line 30, "beings" should be --being--.

Signed and Sealed this

Tenth Day of January 1984

[SEAL]

Attest:

GERALD J. MOSSINGHOFF

Attesting Officer       Commissioner of Patents and Trademarks